(12) United States Patent
Lin

(10) Patent No.: US 7,311,065 B2
(45) Date of Patent: Dec. 25, 2007

(54) POWDER FUEL ENGINE

(76) Inventor: Yi-Hsiung Lin, P.O. Box 90, Tainan City 70499 (TW)

( * ) Notice: Subject to any disclaimer, the term of this patent is extended or adjusted under 35 U.S.C. 154(b) by 68 days.

(21) Appl. No.: 11/437,920

(22) Filed: May 22, 2006

(65) Prior Publication Data

US 2007/0266963 A1   Nov. 22, 2007

(51) Int. Cl.
  *F02B 45/02* (2006.01)
  *F02B 45/08* (2006.01)
(52) U.S. Cl. .......................... 123/23; 123/3; 123/24 R
(58) Field of Classification Search ................ 60/39, 60/464, 39.63; 123/3, 23, 24 R
  See application file for complete search history.

(56) References Cited

U.S. PATENT DOCUMENTS

| | | | |
|---|---|---|---|
| 1,656,678 A | 1/1928 | Pawlikowski | 123/23 |
| 4,018,190 A | 4/1977 | Henault | 123/3 |
| 4,147,136 A | 4/1979 | Noguchi et al. | 123/3 |
| 4,377,066 A | 3/1983 | Dickinson | 60/775 |
| 5,771,847 A | 6/1998 | Duva | 123/1 A |

OTHER PUBLICATIONS

Kleiner, Kurt; Metal: The Fuel of the Future; Oct. 22, 2005; New Scientist; Issue 2522; p. 34.

*Primary Examiner*—Terrence R. Till
*Assistant Examiner*—Keith A Coleman

(57) ABSTRACT

A powder fuel engine includes a battery, a cylinder and a generator. The battery is connected with an air compressor linked with an air tank, and the generator. The air tank is connected with a mixer and two powder tanks respectively via a pressurization tube. The powder tanks are to store different powders and respectively connected with a powder tube connected with the mixer. A powder jetting device connected to the mixer is connected with the cylinder that is provided with a powder combustion chamber, a piston, a spark plug and an outlet. The piston is connected with a connecting rod that is connected with a shaft. The generator is connected with an ignition device that is connected with the spark plug.

2 Claims, 1 Drawing Sheet

POWDER FUEL ENGINE

BACKGROUND OF THE INVENTION

1. Field of the Invention

This invention relates to a powder fuel engine, particularly to one using two different powders as fuel.

2. Description of the Prior Art

Commonly, a conventional automobile engine requires gasoline mixed with air and combusted in an airtight cylinder, so as to alter chemical energy into mechanical energy for driving itself. But, in recent years, the price of gasoline has been raised more and more, forcing consumers to pay a lot more for traffic expense.

SUMMARY OF THE INVENTION

The objective of this invention is to offer a powder fuel engine for an automobile.

The main characteristics of the invention are a battery, a cylinder and a generator. The battery is connected with an air compressor linked with an air tank, and the generator. The air tank is connected with a mixer and two powder tanks respectively via a pressurization tube. The powder tanks are to store different powders and respectively connected with a powder tube that is connected with the mixer. A powder jetting device connected to a mixer is connected with the cylinder. The cylinder is provided with a powder combustion chamber, a piston installed in the powder combustion chamber, a spark plug set on its top and an outlet bored in an upper portion. The piston is connected with a connecting rod that is connected with a shaft. The generator is connected with an ignition device that is connected with the spark plug.

BRIEF DESCRIPTION OF DRAWINGS

This invention is better understood by referring to the accompanying drawings, wherein.

DETAILED DESCRIPTION OF THE PREFERRED EMBODIMENT

Figure 1:
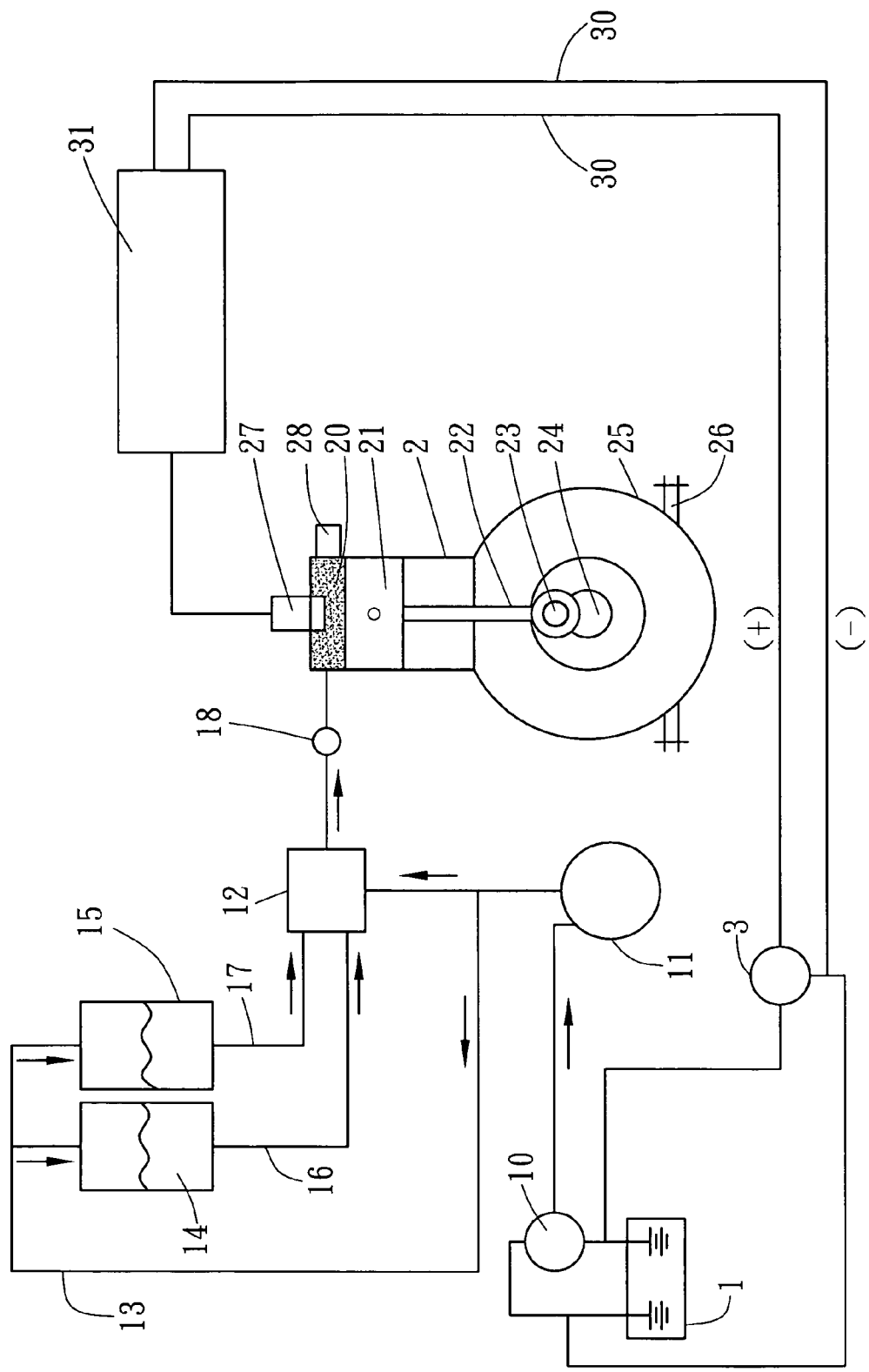
FIG. 1 is a flowchart of a preferred embodiment of a powder fuel engine in the present invention.

As shown in FIG. 1, a preferred embodiment of a powder fuel engine in the present invention includes mainly a battery 1, an air compressor 10, a cylinder 2 and a generator 3.

The battery 1 is connected with the air compressor 10 that is additionally connected with an air tank 11 that is connected with a mixer 12 and two powder tanks 14 and 15 respectively via a pressurization tube 13. Each of the powder tanks 14 and 15 is to store a powder different from each other, and connected with a powder tube 16 or 17 respectively that is connected with the mixer 12 with the other end. A powder jetting device 18 connected beside one side of the mixer 12 is connected with the cylinder 2.

The cylinder 2 is provided with a powder combustion chamber 20 inside it, a piston 21 installed in the powder combustion chamber 20 and an outlet 28 bored in an upper portion. The piston 21 is connected with a connecting rod 22 that is connected with a shaft 23 by the other end. The shaft 23 is connected with a crankshaft 24. All of the connecting rod 22, the shaft 23 and the crankshaft 24 are to work inside a shaft box 25 fixed by a fixing base 26. In addition, there is a spark plug 27 set on the cylinder 2.

The generator 3 connected with the battery 1 is connected with an ignition device 31 by a power line 30. The ignition device 31 is connected with the spark plug 27.

In using, as shown in FIG. 1, when the engine is switched on, the battery 1 is to provide power for the air compressor 10 and the generator 3. The compressor 10 is to work to store air in the air tank 11 for providing some air to the mixer 12 and some air to the powder tanks 14 and 15 via the pressurization tube 13, so as to feed the two powders to the mixer 12 via the powder tubes 16 and 17. Next, the mixture of the powders is to be jetted into the cylinder 2. By the time, the generator 3 powered by the battery 1 is to actuate the ignition device 31 via the power line 30, igniting the spark plug 27 to keep the powder mixture in the cylinder 2 burned up to generate a great pressure enough to push down the piston 21. The connecting rod 22 is successively moved by the piston 21 to turn around pivotally against the crankshaft 24 and drive the crankshaft 24 to turn too. The piston 21 is therefore to reciprocate repeatedly so as to keep the present invention working on and on.

While the preferred embodiment of the invention has been described above, it will be recognized and understood that various modifications may be made therein and the appended claims are intended to cover all such modifications that may fall within the spirit and scope of the invention.

What is claimed is:

1. A powder fuel engine comprising:

a battery connected with an air compressor and a generator, said air compressor connected with an air tank that is connected with a mixer and two powder tanks respectively via a pressurization tube, said powder tanks used to store different powders and connected with a powder tube respectively to said mixer, a powder jetting device installed beside said mixer and connected with a cylinder;

said cylinder provided with a powder combustion chamber inside it, a piston movably installed in said powder combustion chamber, a spark plug set on its top and an outlet bored in an upper portion, said piston connected with a connecting rod that is connected with a shaft by the other end; and said generator connected with an ignition device via a power line, said ignition device connected with said spark plug.

2. The powder fuel engine as claimed in claim 1, wherein said connecting rod and said shaft are installed in a shaft box fixed by a fixing base.

* * * * *